(12) United States Patent
Kwon et al.

(10) Patent No.: US 8,291,296 B2
(45) Date of Patent: Oct. 16, 2012

(54) INFORMATION RECORDING MEDIUM, RECORDING/REPRODUCING APPARATUS AND RECORDING/REPRODUCING METHOD

(75) Inventors: Joon-hwan Kwon, Suwon-si (KR); Kyung-Geun Lee, Seongnam-si (KR); Sung-hae Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1065 days.

(21) Appl. No.: 12/182,216

(22) Filed: Jul. 30, 2008

(65) Prior Publication Data

US 2009/0183054 A1 Jul. 16, 2009

(30) Foreign Application Priority Data

Jan. 10, 2008 (KR) .................. 10-2008-0002928

(51) Int. Cl.
 *G06F 11/00* (2006.01)
(52) U.S. Cl. .................. 714/764; 714/718; 369/53.16
(58) Field of Classification Search .................. 714/764
 See application file for complete search history.

(56) References Cited

U.S. PATENT DOCUMENTS

| | | | | |
|---|---|---|---|---|
| 5,142,515 A * | 8/1992 | McFerrin et al. | .......... | 369/30.11 |
| 6,671,249 B2 * | 12/2003 | Horie | .......... | 369/275.3 |
| 7,249,233 B2 * | 7/2007 | Park | .......... | 711/159 |
| 7,349,301 B2 * | 3/2008 | Terada et al. | .......... | 369/47.13 |
| 7,447,951 B2 * | 11/2008 | Hwang et al. | .......... | 714/710 |
| 7,571,361 B2 * | 8/2009 | Hoshizawa et al. | .......... | 714/710 |
| 7,602,689 B2 * | 10/2009 | Park | .......... | 369/59.25 |
| 7,669,091 B2 * | 2/2010 | Hsueh et al. | .......... | 714/710 |
| 7,681,070 B2 * | 3/2010 | Hwang et al. | .......... | 714/6.13 |
| 7,755,988 B2 * | 7/2010 | Hwang et al. | .......... | 369/47.14 |
| 7,764,579 B2 * | 7/2010 | Hwang et al. | .......... | 369/47.14 |
| 7,788,549 B2 * | 8/2010 | Hsueh et al. | .......... | 714/710 |
| 7,800,994 B2 * | 9/2010 | Hwang et al. | .......... | 369/47.14 |
| 7,823,032 B2 * | 10/2010 | Ghotge et al. | .......... | 714/723 |
| 7,830,769 B2 * | 11/2010 | Yamamoto et al. | .......... | 369/59.25 |
| 7,958,389 B2 * | 6/2011 | Hwang et al. | .......... | 711/159 |
| 7,965,616 B2 * | 6/2011 | Park | .......... | 369/275.3 |

(Continued)

FOREIGN PATENT DOCUMENTS

CN 1701376 A 11/2005

(Continued)

OTHER PUBLICATIONS

PCT Search Report issued Nov. 7, 2008 in corresponding Patent Application No. PCT/KR2008/003850.

(Continued)

*Primary Examiner* — Kamini Patel
(74) *Attorney, Agent, or Firm* — NSIP Law

(57) ABSTRACT

An information recording medium, a recording and/or reproducing apparatus, and a recording and/or reproducing method in which an access time and a frequency of seek operations can be reduced in the information recording medium implementing logical overwrite, thereby allowing noise and power consumption to be reduced. The information recording medium includes: a first area in which user data is recorded and replacement data for replacing defect data among the user data by logical overwrite is recorded; and a second area in which the user data recorded in the first area is copied and recorded, wherein when the user data recorded in the first area is copied and recorded in the second area, the replacement data for replacing the defect data is copied and recorded in a location where the detect data would have been recorded.

25 Claims, 17 Drawing Sheets

U.S. PATENT DOCUMENTS

| | | | |
|---|---|---|---|
| 7,969,842 B2 * | 6/2011 | Yamamoto et al. | 369/53.17 |
| 2002/0056054 A1 * | 5/2002 | Yamamoto et al. | 714/8 |
| 2002/0129200 A1 * | 9/2002 | Arakawa et al. | 711/112 |
| 2004/0128581 A1 | 7/2004 | Yoshida | |
| 2004/0264322 A1 | 12/2004 | Shishido et al. | |
| 2005/0083814 A1 * | 4/2005 | Yoshida et al. | 369/53.15 |
| 2005/0185551 A1 * | 8/2005 | Hwang et al. | 369/53.17 |
| 2005/0188152 A1 * | 8/2005 | Park | 711/112 |
| 2005/0195710 A1 * | 9/2005 | Koda et al. | 369/47.14 |
| 2005/0280912 A1 * | 12/2005 | Park | 360/1 |
| 2006/0007826 A1 * | 1/2006 | Hwang et al. | 369/53.2 |
| 2006/0022849 A1 * | 2/2006 | Hwang et al. | 341/50 |
| 2006/0023621 A1 * | 2/2006 | Hwang et al. | 369/275.3 |
| 2006/0024030 A1 * | 2/2006 | Hwang et al. | 386/95 |
| 2006/0026455 A1 * | 2/2006 | Hwang et al. | 714/5 |
| 2006/0028938 A1 * | 2/2006 | Hwang et al. | 369/47.1 |
| 2006/0044979 A1 * | 3/2006 | Kuraoka et al. | 369/53.17 |
| 2006/0077872 A1 * | 4/2006 | Hwang et al. | 369/275.1 |
| 2006/0087943 A1 * | 4/2006 | Kuraoka et al. | 369/53.2 |
| 2006/0087945 A1 * | 4/2006 | Hwang et al. | 369/53.17 |
| 2006/0098560 A1 * | 5/2006 | Rhyu et al. | 369/275.1 |
| 2006/0123283 A1 * | 6/2006 | Hwang et al. | 714/718 |
| 2006/0126472 A1 * | 6/2006 | Hwang et al. | 369/53.17 |
| 2006/0187782 A1 * | 8/2006 | Hwang et al. | 369/47.14 |
| 2006/0203704 A1 * | 9/2006 | Hwang et al. | 369/275.3 |
| 2006/0212650 A1 * | 9/2006 | Hwang et al. | 711/112 |
| 2007/0086281 A1 * | 4/2007 | Terada et al. | 369/30.07 |
| 2007/0183281 A1 | 8/2007 | Hwang et al. | |
| 2007/0220194 A1 * | 9/2007 | Ijtsma | 711/4 |
| 2007/0226234 A1 * | 9/2007 | Park | 707/100 |
| 2007/0226410 A1 * | 9/2007 | Park | 711/112 |
| 2007/0291608 A1 * | 12/2007 | Hoshizawa et al. | 369/53.16 |
| 2007/0300132 A1 * | 12/2007 | Hsueh et al. | 714/770 |
| 2008/0019247 A1 * | 1/2008 | Nakamura | 369/53.31 |
| 2008/0112282 A1 * | 5/2008 | Hwang et al. | 369/44.39 |
| 2008/0112687 A1 * | 5/2008 | Hwang et al. | 386/95 |
| 2008/0112688 A1 * | 5/2008 | Hwang et al. | 386/95 |
| 2008/0159099 A1 * | 7/2008 | Hwang et al. | 369/53.17 |
| 2008/0165647 A1 * | 7/2008 | Kwon et al. | 369/53.17 |
| 2008/0192595 A1 * | 8/2008 | Ghotge et al. | 369/47.14 |
| 2008/0192597 A1 * | 8/2008 | Hwang et al. | 369/47.14 |
| 2008/0212423 A1 * | 9/2008 | Hwang et al. | 369/47.14 |
| 2008/0212431 A1 * | 9/2008 | Nakamura | 369/53.17 |
| 2008/0259744 A1 * | 10/2008 | Nakamura | 369/30.03 |
| 2008/0273448 A1 * | 11/2008 | Nakamura | 369/275.3 |
| 2008/0279063 A1 * | 11/2008 | Nakamura | 369/47.15 |
| 2008/0279072 A1 * | 11/2008 | Kuraoka et al. | 369/53.17 |
| 2008/0304378 A1 * | 12/2008 | Yamamoto et al. | 369/47.14 |
| 2008/0304382 A1 * | 12/2008 | Nakamura | 369/53.17 |
| 2008/0304383 A1 * | 12/2008 | Yamamoto et al. | 369/53.17 |
| 2008/0310291 A1 * | 12/2008 | Hung et al. | 369/275.3 |
| 2009/0022019 A1 * | 1/2009 | Nakamura | 369/47.14 |
| 2009/0022020 A1 * | 1/2009 | Nakamura | 369/47.14 |
| 2009/0028016 A1 * | 1/2009 | Hayasaka | 369/47.15 |

FOREIGN PATENT DOCUMENTS

| | | |
|---|---|---|
| EP | 1768126 A1 | 3/2007 |
| EP | 1 804 246 | 4/2007 |
| JP | 09-160813 | 6/1997 |
| JP | 2004-103127 A | 4/2004 |
| JP | 2004-362726 | 12/2004 |
| JP | 2006-260376 A | 9/2006 |
| JP | 2008-003932 A | 1/2008 |
| KR | 10-20070038072 | 4/2007 |
| WO | WO 01/22416 | 3/2001 |
| WO | WO 2004/100157 | 11/2004 |
| WO | WO 2004/112025 A1 | 12/2004 |

OTHER PUBLICATIONS

Office Action issued by the State intellectual Property Office of P.R. China on Jul. 26, 2011, in counterpart Chinese Patent Application No. 200880124484.3 (8 pages including English translation).

Office Action issued on Jan. 10, 2012, in corresponding Japanese Patent Application No. 2010-542150, and English translation thereof.

Taiwanese Preliminary Notice of the first Office Action issued Apr. 17, 2012 in counterpart Taiwanese Application No. 97126162 (13 pages).

Japanese Office Action issued Jun. 5, 2012 in counterpart Japanese Application No. 2010-542150 (4 pages with English language translation).

* cited by examiner

FIG. 4A (RELATED ART)

DEFECT LIST

| DEFECT ADDRESS | REPLACEMENT ADDRESS |
|---|---|
| 100h | 200000h |
| 230h | 200001h |
| 440h | 200002h |

FIG. 4B (RELATED ART)

OVERWRITE LIST

| OVERWRITTEN ADDRESS | REPLACEMENT ADDRESS |
|---|---|
| 100h | 200000h |
| 230h | 200001h |
| 440h | 200002h |

FIG. 7C

OVERWRITE LIST

| DEFECT ADDRESS | REPLACEMENT ADDRESS |
|---|---|
| (a,b) | (a',b') |

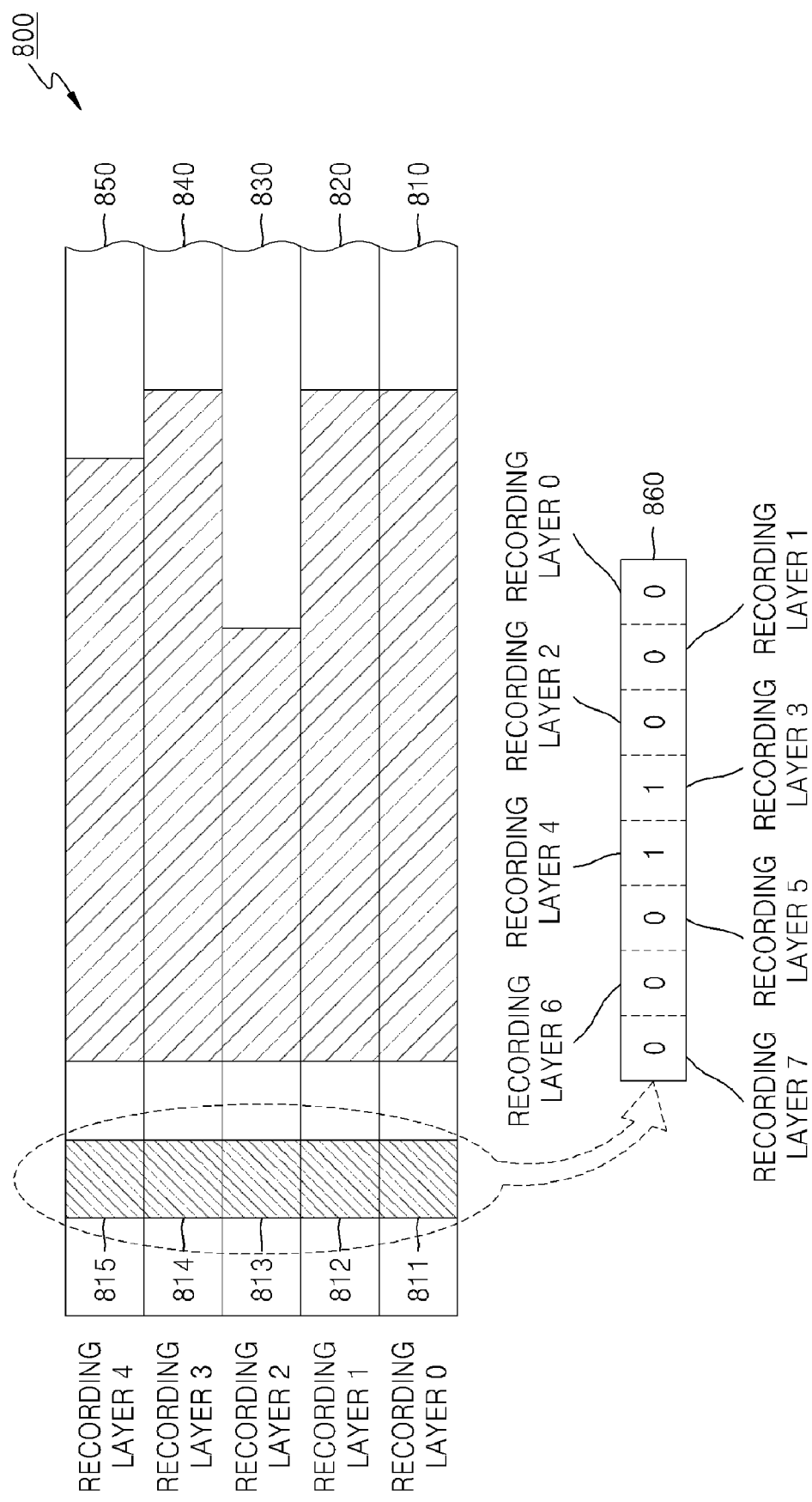

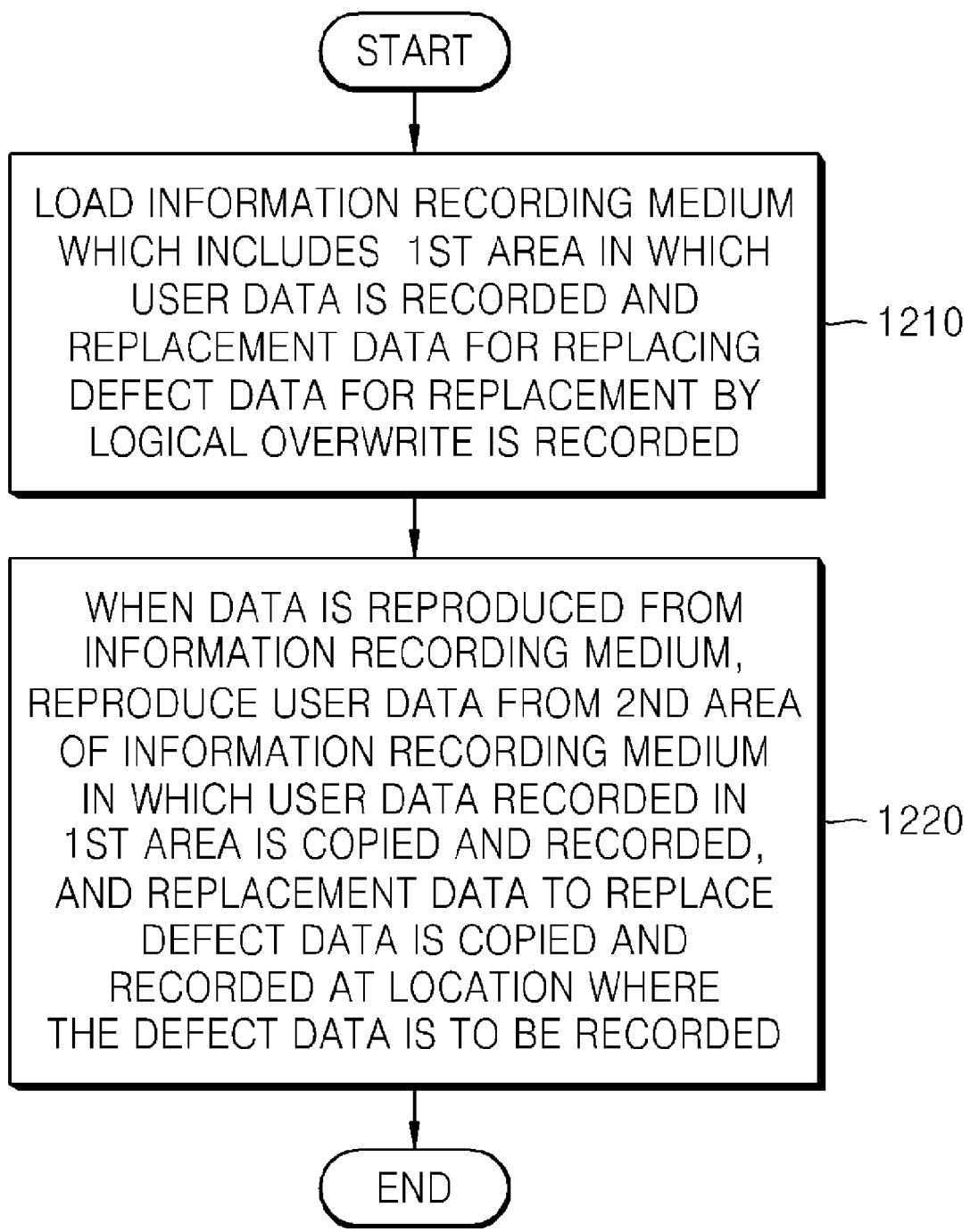

INFORMATION RECORDING MEDIUM, RECORDING/REPRODUCING APPARATUS AND RECORDING/REPRODUCING METHOD

CROSS-REFERENCE TO RELATED APPLICATION

This application claims the benefit of Korean Application No. 2008-2928, filed Jan. 10, 2008, in the Korean Intellectual Property Office, the disclosure of which is incorporated herein by reference.

BACKGROUND OF THE INVENTION

1. Field of the Invention

Aspects of the present invention relate to an information recording medium, a recording and/or reproducing apparatus, and a recording and/or reproducing method enabling information recorded on a medium implementing logical overwrite to be more efficiently reproduced.

2. Description of the Related Art

High density optical discs, such as Blu-ray discs (BDs) and high-definition digital versatile discs (HD DVDs), have been developed and have begun to be distributed in the marketplace. For such optical discs, methods for increasing capacities of the optical discs have been attempted, such as reduction of track intervals and pits by using a single-wave light source, and stacking a plurality of recording and/or reproducing layers in one disc. Such attempts can be seen from the evolution of compact discs (CDs), digital versatile discs (DVDs), the HD DVDs, and the BDs. Apart from methods for increasing capacities of the optical discs, in the case of a BD-recordable (BD-R) disc, a logical overwrite method has been suggested as a method of rewriting data of the BD-R disc at an identical logical address in order to more conveniently use the BD-R write-once disc. The drawback of this method is that, as more logical overwrite operations are performed, fragmentation of data increases, and the amount of data indicating overwritten areas and areas for replacing the overwritten areas also increases. Accordingly, data access time increases.

FIG. 1A is a diagram illustrating a logical structure of a typical single-layer optical disc. Referring to FIG. 1A, the single-layer optical disc includes an arrangement of an inner zone 110, a data zone 120, and an outer zone 130. The inner zone 110 includes a lead-in area 111; the data zone 120 includes an inner spare area 121, a user data area 122, and an outer spare area 123; and the outer zone 130 includes a lead-out area 131. Allocation of the inner spare area 121 and the outer spare area 123 is determined according to whether defect management is employed for the single-layer optical disc. If defect management is employed, replacement data for replacing defect data is recorded in these areas.

FIG. 1B is a diagram illustrating a logical structure of a typical double-layer optical disc. Referring to FIG. 1B, the double-layer optical disc includes a recording layer 0 and a recording layer 1. The recording layer 0 includes an arrangement of an inner zone 0 (140), a data zone 0 (150), and an outer zone 0 (160). The inner zone 0 (140) includes a lead-in area 141, and the data zone 0 150 includes an inner spare area 0 (151), a user data area 0 (152), and an outer spare area 0 (153). The recording layer 1 includes an arrangement of an inner zone 1 (170), a data zone 1 (180), and an outer zone 1 (190). The inner zone 1 (170) includes a lead-out area 171, and the data zone 1 (180) includes an inner spare area 1 (181), a user data area 1 (182), and an outer spare area 1 (183).

Logical overwrite in a write-once disc will now be explained. Due to a characteristic of the medium (e.g., the write-once disc), it is impossible to physically overwrite a written area in the write-once disc. However, techniques can be implemented so that data is as if overwritten on a part of the write-once disc in which data has already been recorded. This is referred to as logical overwrite.

FIG. 2 is a diagram illustrating a write-once disc in which three tracks are allocated according to a typical technology. A disc can be used after being divided into a plurality of tracks, and FIG. 2, shows that a user data area 122 is divided into three tracks numbered 1, 2, 3, and data is recorded in part of a track 1 and part of a track 2. In FIG. 2, NWA indicates a next writable address. In track 1, the next writable address is marked as NWA 1.

FIG. 3A is a diagram illustrating a typical technique where a logical overwrite is performed in a track by allocating a replacement area in an unrecorded area of the track. Referring to FIG. 3A, if a request to write data at an area with an address less than or below an address NWA 1 of the track 1 (i.e., in an area (A) in which data is already recorded) is received, the area (A) is registered as a defect area in a defect list, or the area (A) is registered as a defect area in a separate overwrite list. Then, data of the area (A) is recorded in an area (B) which begins from the NWA 1.

FIG. 3B is a diagram illustrating a typical technique where a logical overwrite is performed in a track by allocating a replacement area in an inner spare area 121 that is separate from the track. Referring to FIG. 3B, if a request to write data at an area with an address less than or below an address NWA 1 of the track 1 (i.e., in an area (A) in which data is already recorded) is received, the area (A) is registered as a defect area in a defect list, or the area (A) is registered as a defect area in a separate overwrite list. Then, data of the area (A) is recorded in a predetermined area (B) of the inner spare area 121.

In the disc in which a logical overwrite operation is performed in these ways, a reproducing apparatus refers to the defect list or the overwrite list, and reproduces data that should be reproduced from an area that is registered in the list as a defect area from a replacement area instead. The defect list or the overwrite list is stored in a lead-in area or a separate system area.

FIG. 4A is a diagram illustrating a typical example of a defect list and FIG. 4B is a diagram illustrating a typical example of an overwrite list. The first entry of the defect list indicates that replacement data to replace data recorded in a defect address 100h is recorded at a replacement address 200000h. The second entry of the defect list indicates that replacement data to replace data recorded in a defect address 230h is recorded at a replacement address 200001h, and the third entry of the defect list indicates that replacement data to replace data recorded in a defect address 440h is recorded at a replacement address 200002h. Each entry illustrated in FIG. 4B is identical to that illustrated in FIG. 4A, and only the names of the lists are different from each other.

As logical overwrite in a write-once disc is implemented in ways discussed above, if more logical overwrite operations are performed as data is recorded, data fragmentation, in which logically continuous data is physically fragmented and then recorded, increases.

FIG. 5A is a diagram illustrating data fragmentation that typically occurs when logical overwrite is performed in a track of a disc by allocating a replacement area in an unrecorded area of the track. Referring to FIG. 5A, a file A and a file B are recorded in a track (i.e., track 1). It is also shown that data in an area 510 of the file A is replaced by replacement data in an area 540, data in an area 520 of the file A is replaced by replacement data in an area 550, and data in an area 530 of the file B is replaced by replacement data in an area 560.

In this state, if a reproducing apparatus is to read the file A, a reproduction order thereof is performed as follows. That is, the reproducing apparatus reads a part of the file A indicated by reference number 1 and then, jumps to the area 540 that replaces the area 510 and reads data indicated by reference number 2. Then, the reproducing apparatus returns to and reads a part of the file A indicated by reference number 3, and then, jumps to the area 550 that replaces the area 520 and reads data indicated by reference number 4, and then, returns again to and reads a part of the file A indicated by reference number 5 to complete a reading of the file A.

FIG. 5B is a diagram illustrating data fragmentation that typically occurs when logical overwrite is performed in a track of a disc by allocating a replacement area in a spare area that is separate from the track. Referring to FIG. 5B, a file A and a file B are recorded in a track (i.e., track 1). It is also shown that data in an area 510 of the file A is replaced by replacement data in an area 540 in an inner spare area 121, data in an area 520 of the file A is replaced by replacement data in an area 550 in an outer spare area 123, and data in an area 530 of the file B is replaced by replacement data in an area 560 of the outer spare area 123.

In this state, if a reproducing apparatus is to read the file A, a reproduction order thereof is performed as follows. That is, the reproducing apparatus reads a part of the file A indicated by reference number 1 and then, jumps to the area 540 that replaces the area 510 and reads data indicated by reference number 2. Then, the reproducing apparatus returns to and reads a part of the file A indicated by reference number 3, and then, jumps to the area 550 that replaces the area 520 and reads data indicated by reference number 4, and then, returns again to and reads a part of file A indicated by reference number 5 to complete a reading of the file A.

If data fragmentation increases due to an increase in logical overwrite operations as described above, seek operations for replacement data occur frequently when a file is reproduced, thereby increasing the access or seek time. Also, data fragmentation increases the size of the defect list or the overwrite list, thereby making management of the list more difficult. That is, a search time of the defect list or the overwrite list increases, more time for registering new entries is needed, and more management areas for recording the defect or the overwrite lists in the lead-in area are needed.

SUMMARY OF THE INVENTION

Aspects of the present invention provide an information recording medium, a recording and/or reproducing apparatus, and a recording and/or reproducing method in which an access time and the frequency of seek operations can be reduced in the information recording medium implementing logical overwrite, thereby allowing noise and power consumption to be reduced.

According to an aspect of the present invention, an information recording medium includes: a first area in which user data is recorded and replacement data for replacing defect data among the user data by logical overwrite is recorded; and a second area in which the user data recorded in the first area is copied and recorded, wherein when the user data recorded in the first area is copied and recorded in the second area, the replacement data for replacing the defect data is copied and recorded in a location where the detect data would have been recorded.

According to an aspect of the present invention, a logical start address of the information recording medium may correspond to a physical start address of the second area.

According to an aspect of the present invention, information indicating that data from a start address to a last address of the first area is replaced by data from a start address to a last address of the second area may be recorded in a predetermined area of the information recording medium.

According to an aspect of the present invention, the information recording medium may include a plurality of recording layers, wherein the first area comprises at least one recording layer from among the plurality of recording layers, and the second area comprises at least one other recording layer from among the plurality of recording layers.

According to an aspect of the present invention, the at least one other recording layer included in the second area may be designated as a valid recording layer, and information on the valid recording layer may be recorded in a predetermined area of the information recording medium.

According to another aspect of the present invention, an apparatus to record data on an information recording medium includes: a pickup to record data on the information recording medium including a first area in which user data is recorded and replacement data for replacing defect data among the user data by logical overwrite is recorded; and a control unit to control the pickup to copy and record the user data recorded in the first area in a second area of the information recording medium and to copy and record the replacement data for replacing the defect data in a location when the defect data would have been recorded, when the user data recorded in the first area is copied and recorded in the second area.

According to an aspect of the present invention, the control unit may further control the pickup to record information indicating that data from a start address to a last address of the first area is replaced by data from a start address to a last address of the second area in a predetermined area of the information recording medium.

According to another aspect of the present invention, a method of recording data on an information recording medium includes: copying the user data recorded in the first area and recording the copied user data in a second area in the information recording medium including a first area in which user data is recorded and replacement data for replacing defect data among the user data by logical overwrite is recorded, wherein when the user data recorded in the first area is copied and recorded in the second area, the replacement data for replacing the defect data is recorded in a location where the defect data would have been recorded.

According to another aspect of the present invention, an apparatus to reproduce data from an information recording medium including a first area in which user data is recorded and replacement data for replacing defect data among the user data by logical overwrite is recorded includes: a pickup to read data from the information recording medium; and a control unit to control the pickup to read user data from a second area of the information recording medium in which user data recorded in the first area is copied and recorded, and the replacement data for replacing the defect data is copied and recorded in a location where the defect data would have been recorded.

According to another aspect of the present invention, a method of reproducing data from an information recording medium including a first area in which user data is recorded and replacement data for replacing defect data among the user data by logical overwrite is recorded, includes: reproducing user data from a second area of the information recording medium in which user data recorded in the first area is copied and recorded, and the replacement data for replacing the defect data is copied and recorded in a location where the defect data would have been recorded.

According to another aspect of the present invention, an information recording medium includes one or more areas containing a file including defect data, and replacement data of the defect data that is logically continuous with the file but physically fragmented from the file; and another area containing a copy of the file not including the defect data, the copy of the file being logically and physically intact with the replacement data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIG. 4A is a diagram illustrating a typical example of a defect list and FIG. 4B is a diagram illustrating a typical example of an overwrite list;

FIG. 7C is a diagram illustrating an example of an overwrite list according to an aspect of the present invention;

FIG. 8 is a diagram illustrating a disc having a plurality of recording layers to which an aspect of the present invention is applied;

FIG. 12 is a flowchart illustrating operations of a reproducing method according to an aspect of the present invention.

DETAILED DESCRIPTION OF THE EMBODIMENTS

Figure 1A:
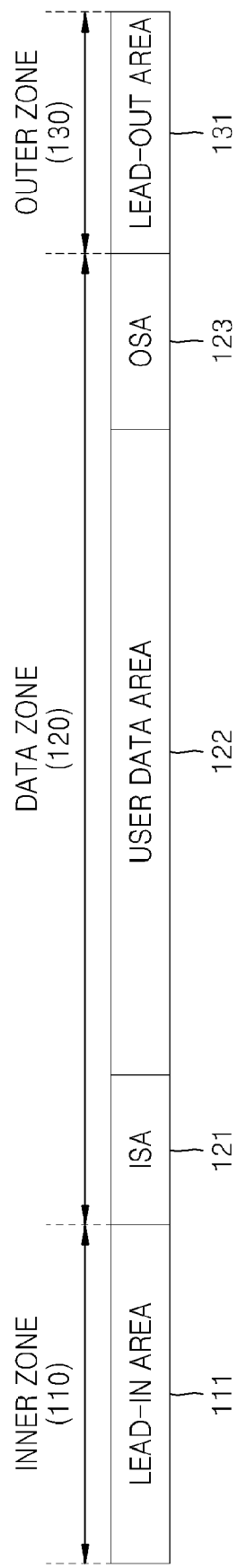
FIG. 1A is a diagram illustrating a logical structure of a typical single-layer optical disc.
Figure 1B:
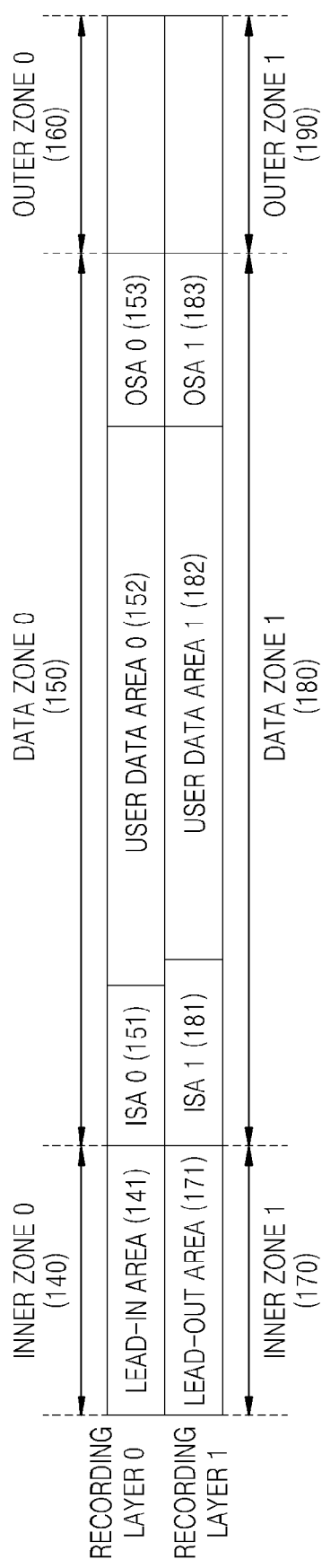
FIG. 1B is a diagram illustrating a logical structure of a typical double-layer optical disc.
Figure 2:
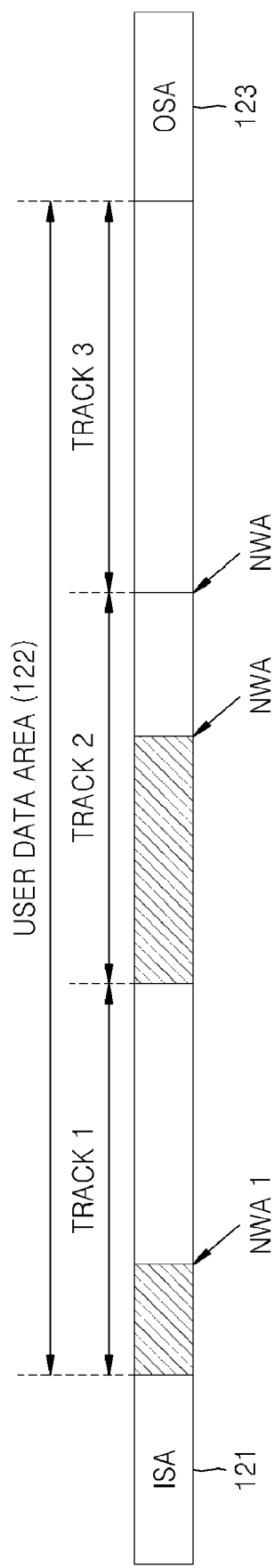
FIG. 2 is a diagram illustrating a write-once disc in which three tracks are allocated according to a typical technology.
Figure 3A:
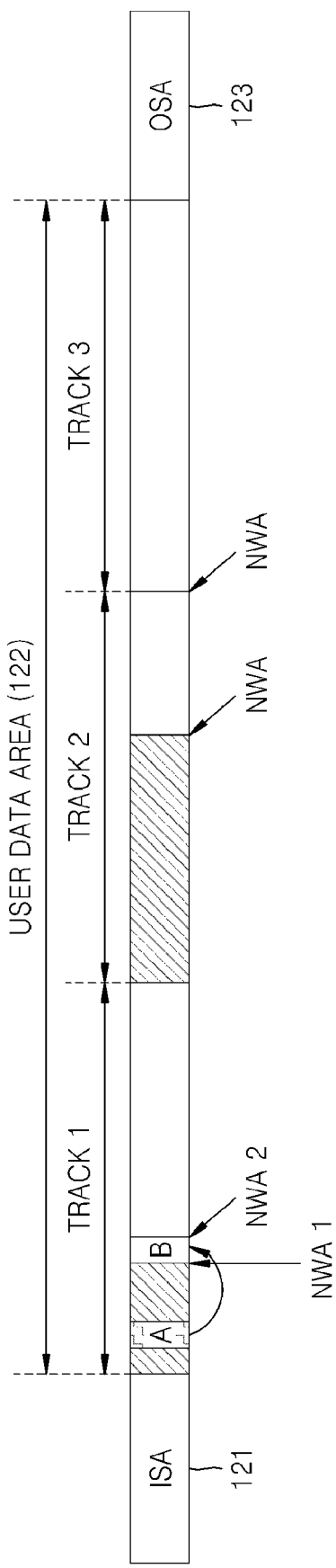
FIG. 3A is a diagram illustrating a typical technique where logical overwrite is performed in a track by allocating a replacement area in an unrecorded area of the track.
Figure 3B:
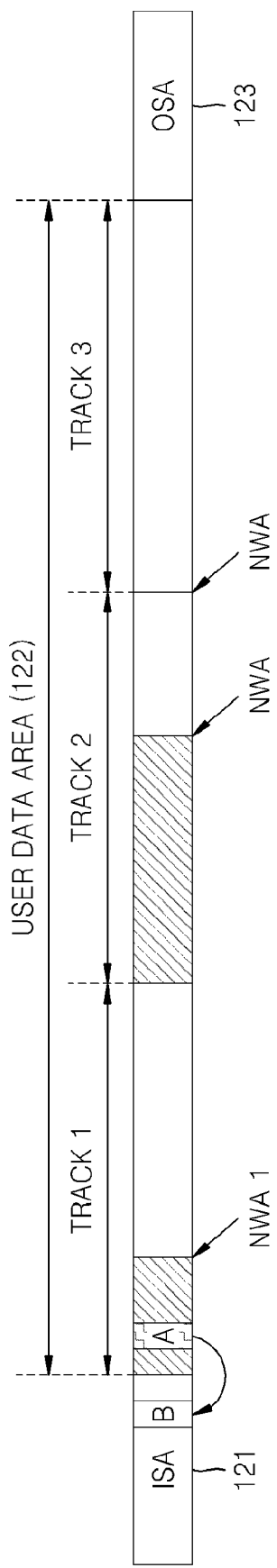
FIG. 3B is a diagram illustrating a typical technique where logical overwrite is performed in a track by allocating a replacement area in an inner spare area that is separate from the track.
Figure 5A:
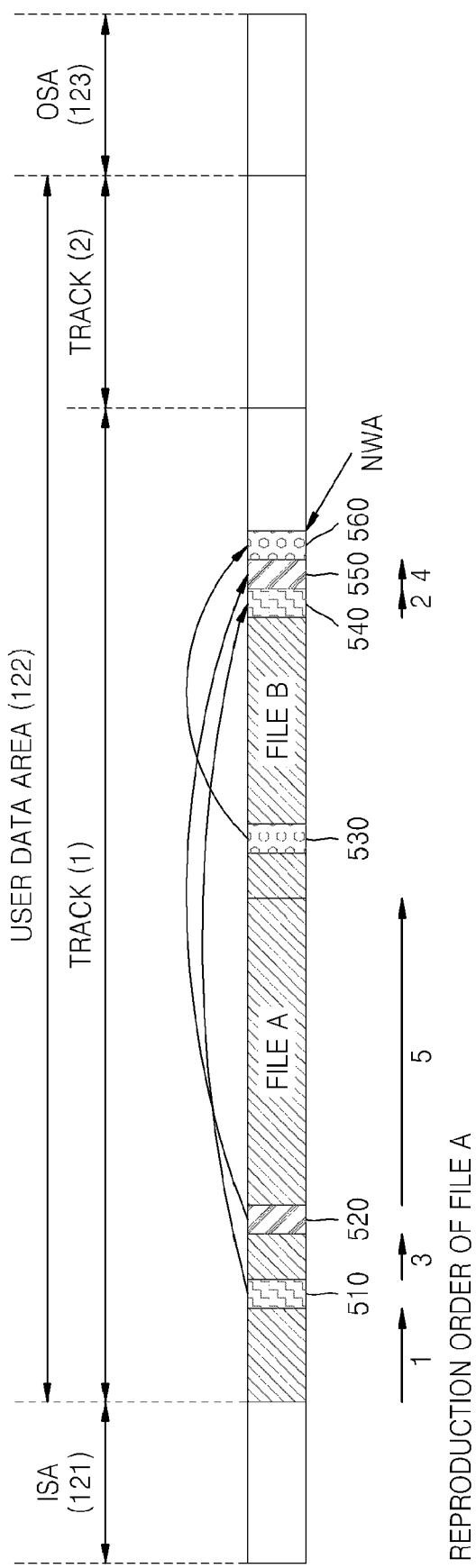
FIG. 5A is a diagram illustrating data fragmentation that typically occurs when logical overwrite is performed in a track of a disc by allocating a replacement area in an unrecorded area of the track.
Figure 5B:
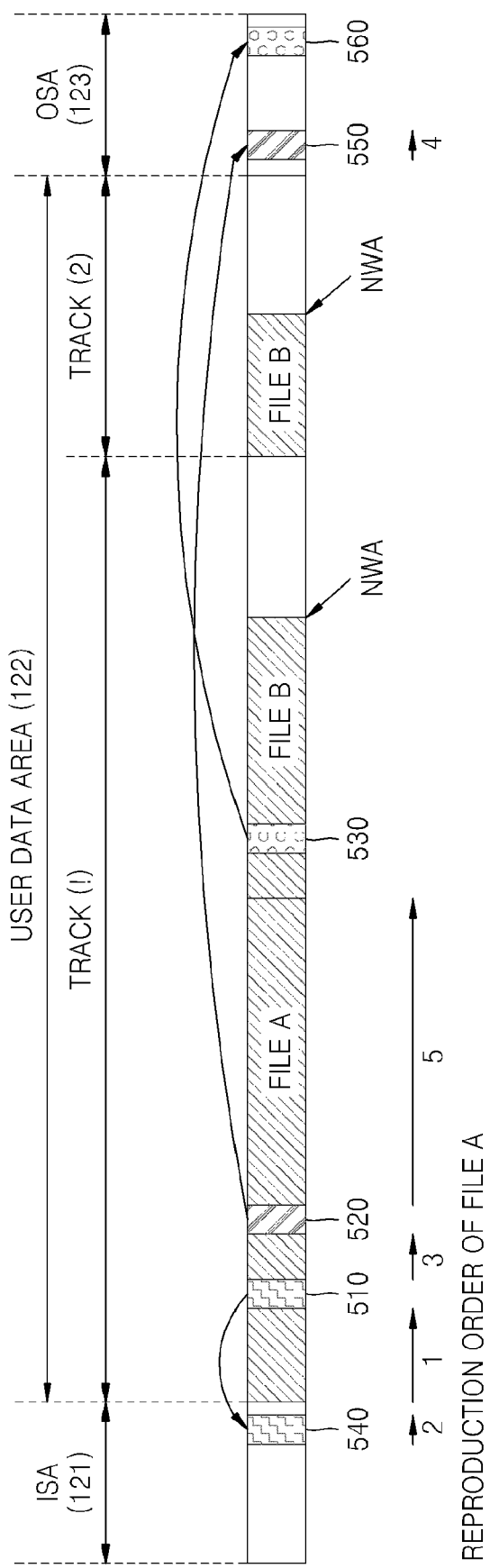
FIG. 5B is a diagram illustrating data fragmentation that typically occurs when logical overwrite is performed in a track of a disc by allocating a replacement area in a spare area that is separate from the track.

Reference will now be made in detail to the aspects of the present invention, examples of which are illustrated in the accompanying drawings, wherein like reference numerals refer to the like elements throughout. The aspects are described below in order to explain the present invention by referring to the figures.

Aspects of the present invention suggest that when a write-once disc is used, or when a write-once disc is finalized, data fragmented by logical overwrites is collected, arranged, and copied, thereby allowing the data to be read at once without a need to access many locations containing the fragmented data in order to read a defragmented data.

Figure 6A:
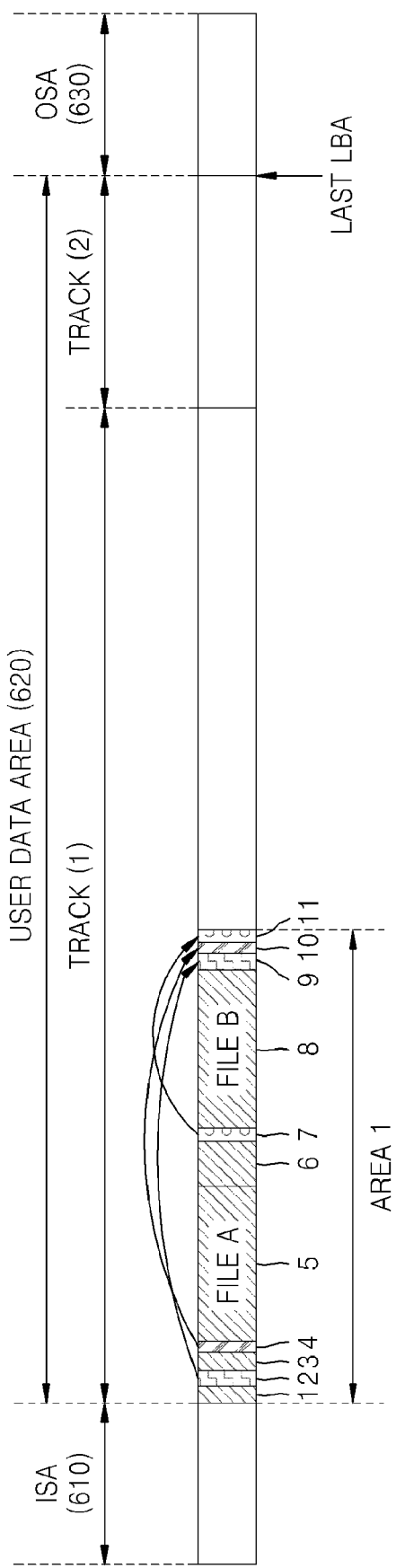
FIGS. 6A and 6B are diagrams illustrating data defragmentation that occurs in a track when logical overwrite is performed by allocating a replacement area in an unrecorded area of the track according to an aspect of the present invention.
Figure 6B:
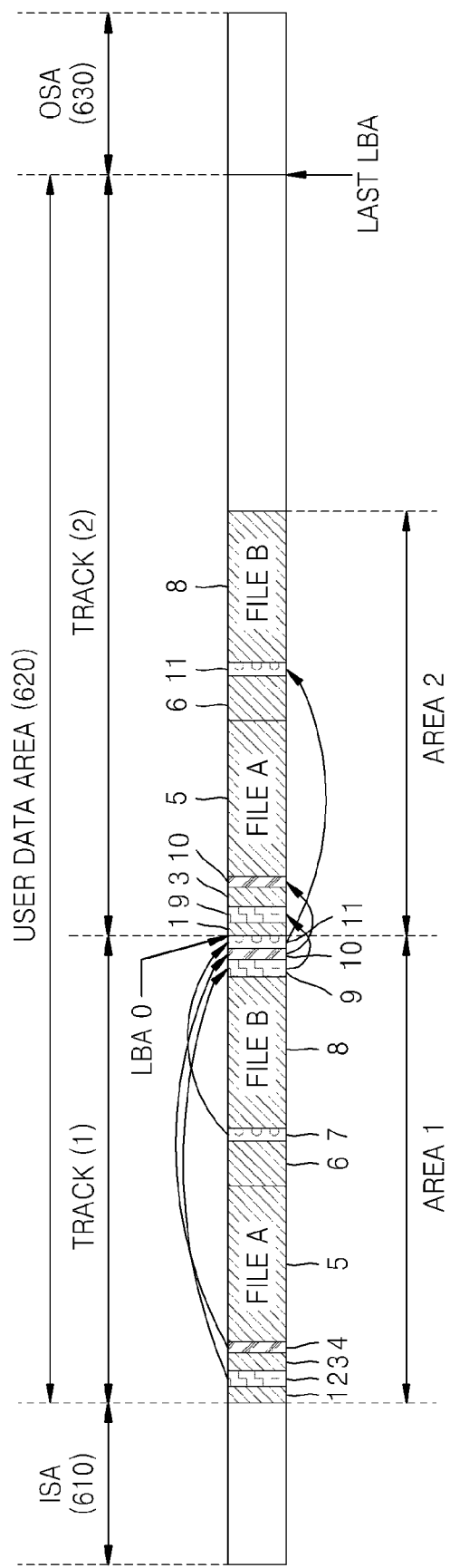

FIGS. 6A and 6B are diagrams illustrating data defragmentation that occurs in a track when a logical overwrite is performed by allocating replacement areas in an unrecorded area of the track according to an aspect of the present invention. FIG. 6A illustrates a disc before defragmentation is performed according to an aspect of the present invention.

Referring to FIG. 6A, the write-once disc includes an inner spare area (ISA) 610, a user data area 620, and an outer spare area (OSA) 630. In track 1 of the user data area 620, a file A and a file B are recorded. The file A includes portions of data numbered 1-5 (hereinafter referred to as data 1 through data 5) and the file B includes portion of data numbered 6-8 (hereinafter referred to as data 6 through data 8). It is illustrated in FIG. 6A that data 2 of the file A is replaced by replacement data 9, data 4 of the file A is replaced by replacement data 10, and data 7 of the file B is replaced by replacement data 11. In this aspect of the present invention, the data 2, the data 4, and the data 7 are defective data (or defect data). Accordingly, in this case, the replacement data 9, the replacement data 10, and the replacement data 11 are non-defective data of the respective data 2, data 4, and data 7.

In another aspect of the present invention, the data 2, the data 4, and the data 7 may not be defective data, but rather, the areas of the write-once disc respectively containing the data 2, the data 4, and the data 7, may be defective areas. Accordingly, in this case, the replacement data 9 is a duplicate of the data 2, the replacement data 10 is a duplicate of the data 4, and the replacement data 11 is a duplicate of the data 7.

In yet other aspects of the present invention, it should be understood that a cause of the defective data may be due to an underlying defect in the area (i.e., defective area) containing data. For example, the underlying defect in the area may prevent error-free recording (or writing) and/or reproducing (or reading) of the data or portions thereof.

Hereinafter, aspects of the present invention involving replacement of defective data will be discussed. However, it should be understood that aspects of the present invention are applicable to above noted cases involving defective areas but non-defective data, cases involving a mix of defective areas and defective data, and/or cases involving defective area causing erroneous recording and/or reproducing of data so as to generate defective data.

FIG. 6B illustrates the disc of FIG. 6A after defragmentation is performed according to an aspect of the present invention. Referring to FIG. 6B, user data of a first area (AREA 1) is copied and recorded in a second area (AREA 2). In this case, at an address where defect data (i.e., defective data) is to be copied or located, replacement data that replaces the defect data is copied and recorded instead. That is, referring to an arrangement of data copied into the second area (AREA 2), replacement data 9 that replaces data 2 is copied and recorded after data 1. Then, replacement data 10 that replaces data 4 is copied and recorded after data 3. Then, replacement data 11 that replaces data 7 is copied and recorded after data 6. Accordingly, the entire data of file A and file B are recorded intact and without being fragmented in the second area (AREA 2). In this aspect of the present invention, the first area (AREA 1) refers to an area of the disc containing a fragmented file or data, and the second area (AREA 2) refers to an area of the disc containing (or to contain) a defragmented copy of the fragmented file or data from the first area. In various aspects of the present invention, replacement data refers to a non-defect data or error free data.

Figure 7A:
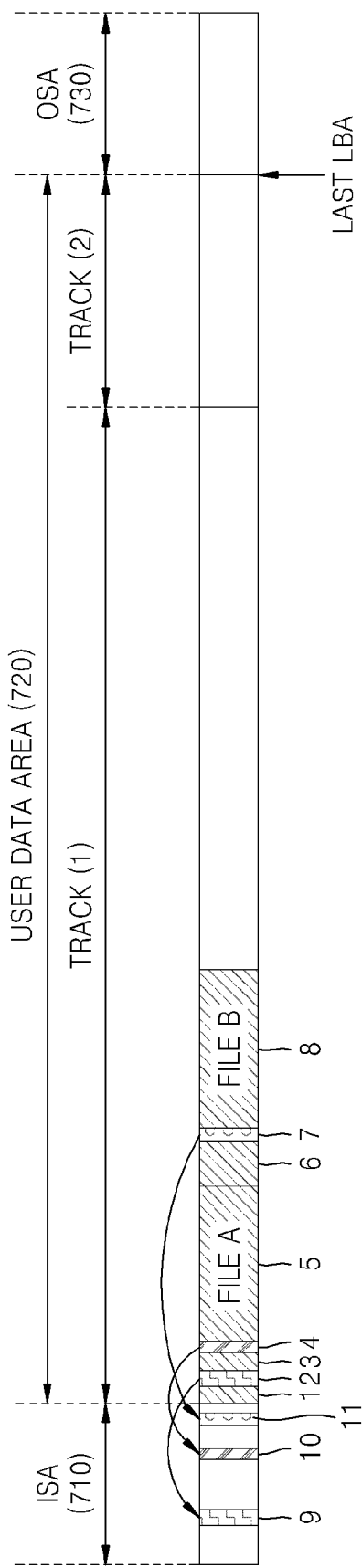
FIGS. 7A and 7B are diagrams illustrating data defragmentation that occurs when logical overwrite is performed in a track of a disc by allocating a replacement area in a spare area that is separate from the track according to an aspect of the present invention.
Figure 7B:
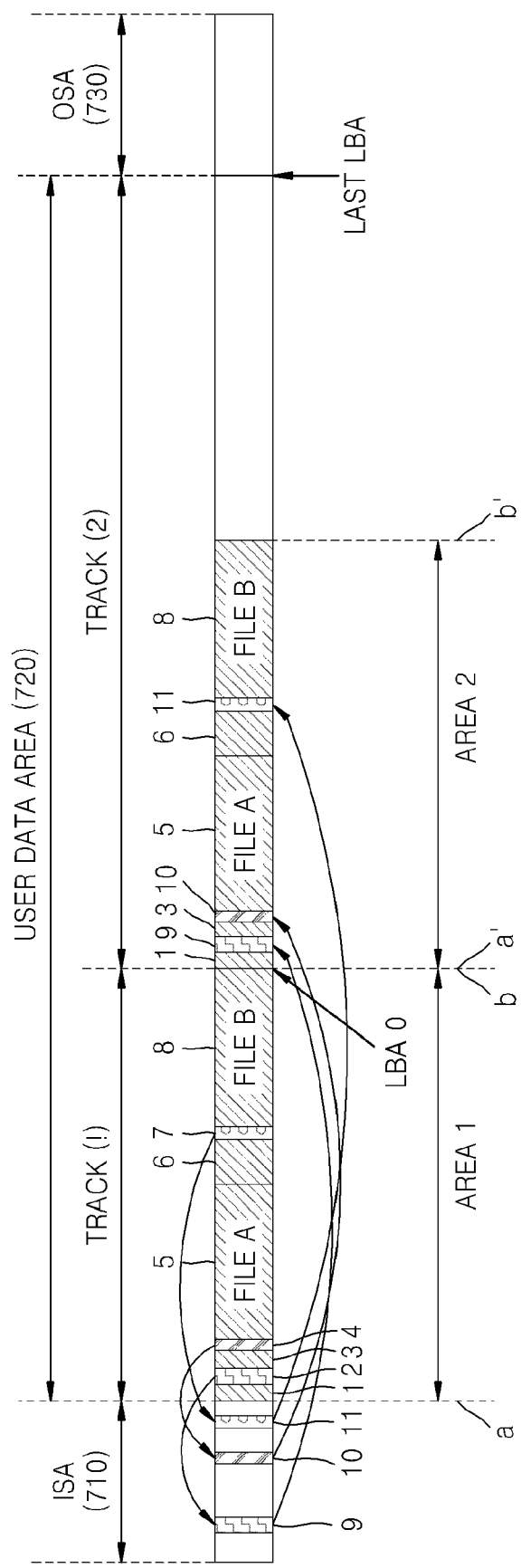

FIGS. 7A and 7B are diagrams illustrating data defragmentation that occurs when logical overwrite is performed in a track of a disc by allocating a replacement area in a spare area of the disc according to an aspect of the present invention. FIG. 7A illustrates a disc before defragmentation is performed according to an aspect of the present invention.

Referring to FIG. 7A, the write-once disc includes an inner spare area (ISA) 710, a user data area 720, and an outer spare area (OSA) 730. In track 1 of the user data area 720, a file A and a file B are recorded, and it is illustrated that data 2 of the file A is replaced by replacement data 9, data 4 of the file A is replaced by replacement data 10, and data 7 of the file B is replaced by replacement data 11. As shown in FIG. 7A, the replacement data 9, 10, and 11 are recorded in the ISA 710.

FIG. 7B illustrates the disc of FIG. 7A after defragmentation is performed according to an aspect of the present invention. Referring to FIG. 7B, user data of a first area (AREA 1) is copied and recorded in a second area (AREA 2). In this case, at an address where defect data (i.e., defective data) is to be copied or located, replacement data that replaces the defect data is copied and recorded instead. That is, referring to an arrangement of data copied into the second area, replacement data 9 that replaces data 2 is copied and recorded after data 1. Then, replacement data 10 that replaces data 4 is copied and recorded after data 3. Then, replacement data 11 that replaces data 7 is copied and recorded after data 6. Accordingly, the entire data of file A and file B are recorded intact and without being fragmented in the second area (AREA 2). In this aspect of the present invention, the first area (AREA 1) refers to an area of the disc containing a file or data with defect data, and the second area (AREA 2) refers to an area of the disc containing (or to contain) a defragmented copy of the fragmented file or data from the first area and a spare area.

In this way, if fragmentation of a disc increases due to logical overwrites and defect management of the disc, a host apparatus can determine whether to perform defragmentation of the disc. In a file system, the whole capacity of data (including file system data) is confirmed, and if an area in which the data can be recorded continuously (or intact) is greater than the size of data to be recorded, it is possible to physically and continuously record data that was fragmented due to logical overwrite or defect management of the disc. That is, fragmented data from one or more areas of a disc are defragmented by being copied in another area of the disc intact so as to be in both logical and physical sequences.

In relation to connecting logical addresses and physical addresses after defragmentation of data, the connection thereof can be performed according to two methods. One method is newly forming a relationship between a logical block address (lba) and a physical sector number (psn). That is, if lba(n) corresponds to psn(n+k) in a previous relationship, a start address of a second area that is newly designated is allocated as lba 0. That is, the new relationship is formed such that lba(n) can correspond to psn(n+k+t). In this case, t may be the size of the first area.

The other method to connect logical addresses and physical addresses after defragmentation of data is by using a typical defect list or an overwrite list. If defects occur continuously over a plurality of blocks, it is possible to register the defects in a defect list or an overwrite list as continuous intervals. For example, if the start address and end address of the first area illustrated in FIG. 7B are a and b, respectively, and the start address and end address of the second area illustrated in FIG. 7B are a' and b', respectively, the defect list or the overwrite list may have entries as illustrated in FIG. 7C. That is, the entries illustrated in FIG. 7C indicate that a defect area in which the start address is a and the end address is b is replaced by a replacement area in which the start address is a' and the end address is b'.

FIG. 8 is a diagram illustrating a disc having a plurality of recording layers to which an aspect of the present invention is applied. As shown in FIG. 8, a multilayered disc includes a recording layer 0 (810), a recording layer 1 (820), a recording layer 2 (830), a recording layer 3 (840), and a recording layer 4 (850).

In FIG. 8, fragmented data is included in the recording layer 0 (810) through the recording layer 2 (830), and the recording layer 0 (810) through the recording layer 2 (820) are designated as a first area. Further, user data (fragmented data) included in the first area is defragmented in a second area formed over the recording layer 3 (840) and the recording layer 4 (850). After performing defragmentation, the recording layer 0 (810) through the recording layer 2 (830) are designated as invalid recording layers, and the recording layer 3 (840) and the recording layer 4 (850) are designated as valid recording layers. Information on these valid recording layers is recorded in a predetermined area of the disc. In aspects of the present invention, information on these invalid recording layers may also be recorded in the predetermined area of the disc or another predetermined area of the disc.

Referring again to FIG. 8, information on the valid recording layers may be recorded in a predetermined area 811 of the recording layer 0 (810), a predetermined area 812 of the recording layer 1 (820), a predetermined area 813 of the recording layer 2 (830), a predetermined area 814 of the recording layer 3 (840), and a predetermined area 815 of the recording layer 4 (850). Accordingly, flags (or flag) 860 on valid recording layers may be or are recorded therein. The flags 860 on valid recording layers are formed by 8 bits, thereby allowing valid recording layers to be indicated up to a total of 8 layers. However, in the example illustrated in FIG. 8, recording layer up to the recording layer 4 (850) is be indicated as a valid recording layer. In other aspects, the flags 860 on valid recording layers may be formed by a number of bits other than 8.

In aspects of the present invention, a valid recording layer can be indicated by setting a corresponding bit of the flags 860 to 1. In the example illustrated in FIG. 8, a valid recording layer flag is recorded in each and every recording layer. However, aspects of the present invention are not limited to this, and a valid recording layer flag need only to be recorded in at least one recording layer.

Figure 9:
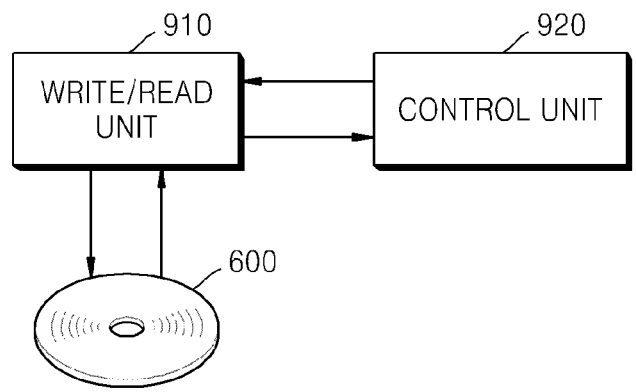
FIG. 9 is a schematic block diagram of a recoding and/or reproducing apparatus according to an aspect of the present invention.

FIG. 9 is a schematic block diagram of a recoding and/or reproducing apparatus according to an aspect of the present invention. Referring to FIG. 9, the recording and/or reproducing apparatus includes a write/read unit 910 and a control unit 920.

According to control of the control unit 920, the write/read unit 910 records data on a write-once disc 600 which is an information recording medium according to an aspect of the present invention, and reads recorded data from the write-once disc 600. The write-once disc 600 includes a first area in which user data and replacement data are recorded. In aspects of the present invention, replacement data refers to data to replace specific defect data within the user data in order to logically overwrite the defect data. The recording aspect of the apparatus and the reproducing aspect of the apparatus can be implemented as separate apparatuses, or can be implemented in one system as illustrated in FIG. 9.

The control unit 920 controls the write/read unit 910 so that data can be recorded on or read from the write-once disc 600. When the data is recorded, the control unit 920 controls the pickup (not shown) of the write/read unit 910 so that the user data recorded in the first area can be copied and recorded in the second area of the write-once disc 600, and the replacement data to replace defect data can be copied and recorded at a location where the defect data is to be (or would have been) recorded. In this case, after the copying and recording of the user data and the replacement data, the control unit 920 may make a logical start address of the information recording medium to correspond to the physical start address of the second area, or may manage the address of the second area by using information indicating that the data from the start address to the last address of the first area is replaced by data from the start address to the last address in the second area.

Also, when the write-once disc 600 includes a plurality of recording layers, the first area may include one or more recording layers from the plurality of recording layers, and the second area may include one or more other recording layers from the plurality of recording layers. In this case, the control unit 920 may designate the one or more other recording layers included in the second area as valid recording layers, and control the pickup so that information on the valid recording layers in the second area can be recorded in a predetermined area of the write-once disc 600.

When data is reproduced, the control unit 920 controls the pickup so that user data including the replacement data can be read from the second area of the write-once disc. Also, the control unit 920 further controls the pickup so that the information indicating that the data from a start address to a last address of the first area is replaced by data from a start address to a last address in the second area can be read from the predetermined area of the write-once disc 600. Also, the control unit 920 further controls the pickup so that the information on the valid recording layers (which are recording layers included in the second area and designated as valid recording layers) can be read from the predetermined area of the write-once disc 600.

Figure 10:
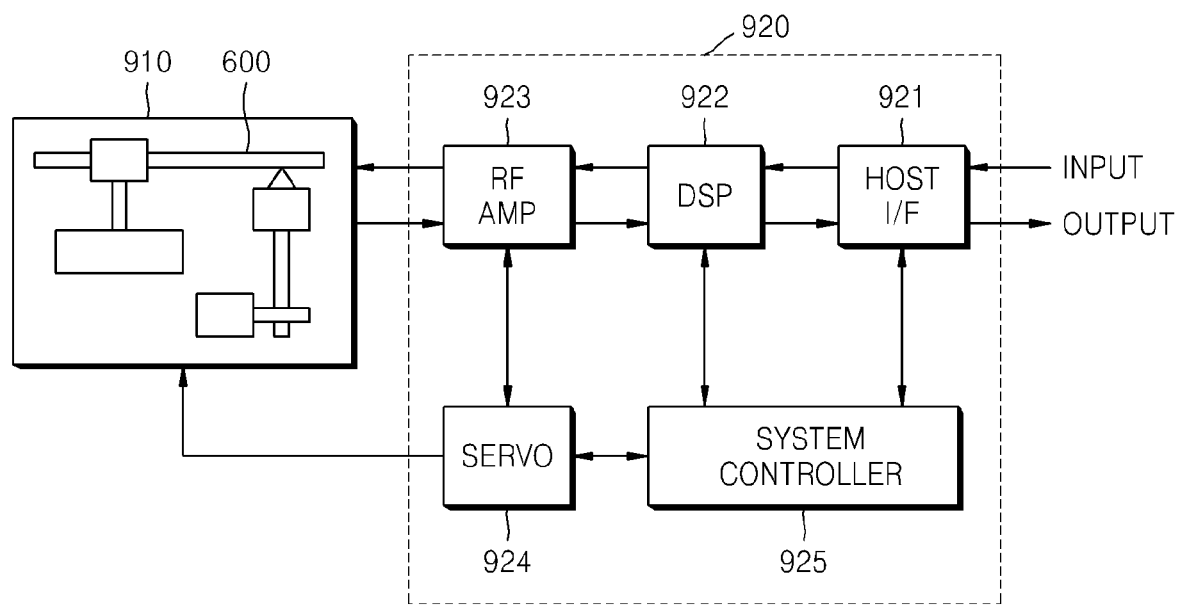
FIG. 10 is a block diagram of a drive in which the recording and/or reproducing apparatus illustrated in FIG. 9 is implemented according to an aspect of the present invention.

FIG. 10 is a block diagram of a drive in which the recording and/or reproducing apparatus illustrated in FIG. 9 is implemented according to an aspect of the present invention. Referring to FIG. 10, the drive includes a pickup which is constituted as the write/read unit 910. The write-once disc 600 is placed in the pickup. Also, the drive includes the control unit 920 that includes a host I/F 921, a DSP 922, an RF AMP 923, a servo 924, and a system controller 925.

When data is recorded, the host I/F 921 receives data to be recorded together with a record command from a host apparatus (not shown). The system controller 925 performs initialization required for recording. The DSP 922 adds additional data such as a parity data for error correction of the received data to be recorded, thereby performing ECC encoding, and then, modulates the ECC encoded data via a predetermined method. The RF AMP 923 converts the data output from the DSP 922 into an RF signal. The pickup 910 records the RF signal output from the RF AMP 923 on the write-once disc 600. The servo 924 servo-controls the pickup 910 by receiving a command required for servo control from the system controller 925. Also, when data is recorded, the system controller 925 commands the pickup 910 to read recorded data or to record predetermined information such as temporary management information, in order to perform defect management according to aspects of the present invention.

When data is reproduced, the host I/F 921 receives a reproduction command from the host apparatus (not shown). The system controller 925 performs initialization required for reproduction. The pickup 910 radiates a laser beam onto the write-once disc 600, and outputs an optical signal obtained by receiving the laser beam reflected from the write-once disc 600. The RF AMP 923 converts the optical signal output from the pickup 910 into an RF signal, and provides the modulated data obtained from the RF signal to the DSP 922, while providing a servo signal for control obtained from the RF signal to the servo 924. The DSP 922 demodulates the modulated data and outputs data obtained through ECC error correction. Meanwhile, the servo 924 receives the servo signal from the RF AMP 923 and a command required for servo control received from the system controller 925, and performs servo control of the pickup 910. The host I/F 921 transmits the data received from the DSP 922 to the host apparatus.

Figure 11:
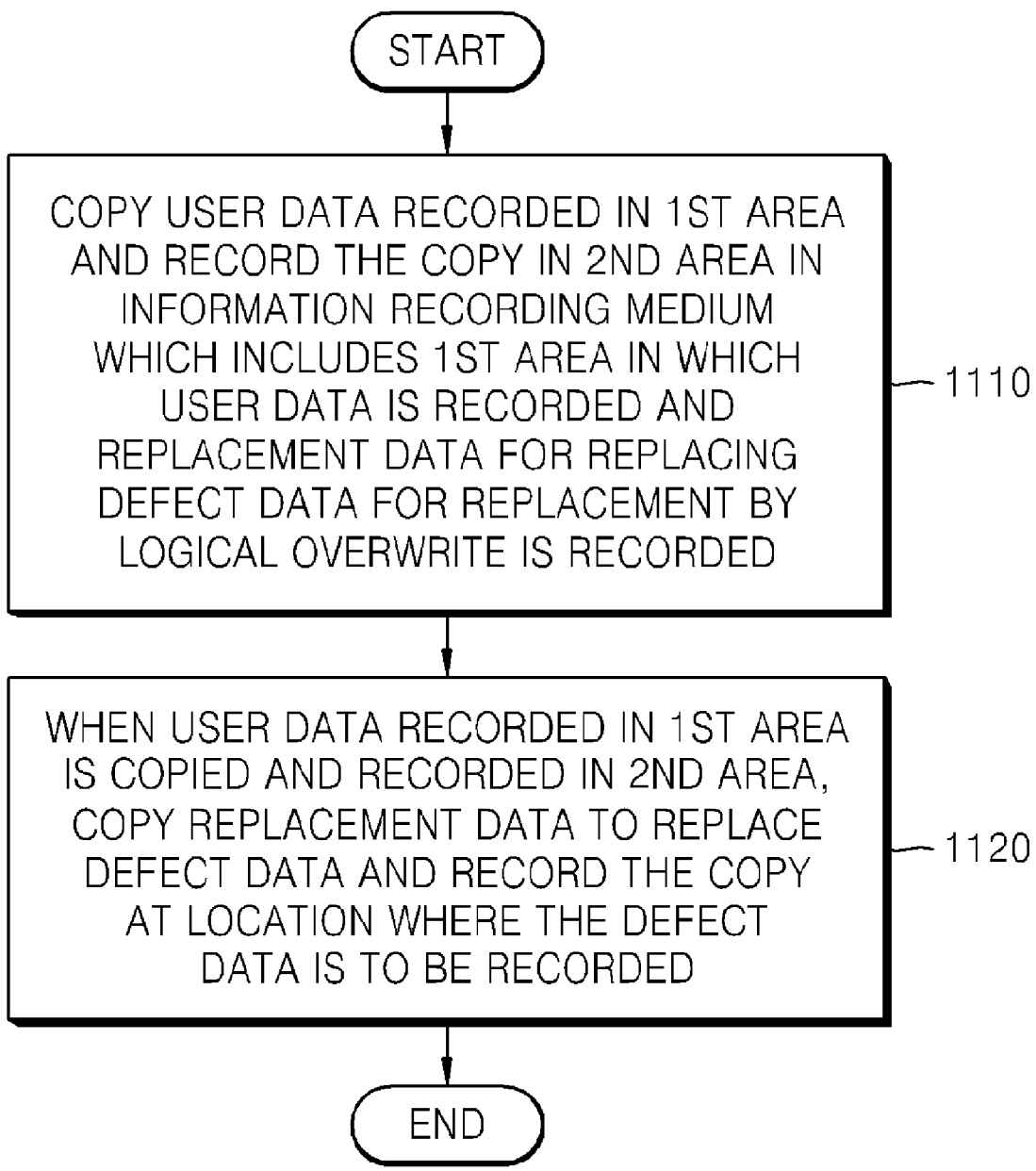
FIG. 11 is a flowchart illustrating operations of a recording method according to an aspect of the present invention.

FIG. 11 is a flowchart illustrating operations of a recording method according to an aspect of the present invention. On an information recording medium which includes a first area in which user data and replacement data are recorded (the replacement data referring to data that replaces specific defect data within the recorded user data in order to logically overwrite defect data), the user data recorded in the first area is copied and recorded in a second area of the information recording medium (operation 1110). When the user data recorded in the first area is copied and recorded in the second area, the replacement data that replaces the defect data is also copied and recorded in a location where the defect data would have been recorded (operation 1120).

FIG. 12 is a flowchart illustrating operations of a reproducing method according to an aspect of the present invention. An information recording medium (which includes a first area in which user data is recorded and replacement data that replaces specific defect data within the recorded user data in order to logically overwrite defect data is recorded, as well as a second area in which defragmented user data is recorded) is loaded (operation 1210). Then, the defragmented user data is reproduced from the second area of the information recording medium (operation 1220). In aspects of the present invention, the replacement data refers to data to replace the defect data in the user data, and which is copied and recorded at a location within the user data that would have been occupied with the defect data if the user data was not defragmented.

Reduction in access performance by logical overwrite will now be explained excluding effects of fragmentation that occurs as a result of defect management. For purposes of this explanation, it is assumed that the whole capacity of a medium, such as a disc, is C, the amount of recorded data therein is W, the ratio of the logically-overwritten area to the whole area therein is Q, and an average seek time thereof is S. Also, it is assumed that overwritten areas and replacement areas therein for the overwriting operations have identical distributions of probabilities (uniform distribution). The disc rotation latency is ignored.

The access time additionally expended for reproducing recorded data in the medium is (W/block size)*Q*S*2. With the increasing of W, it is highly probable that Q increases. The more the disc is used, the access time increases exponentially.

If the whole capacity of the disc is 50 GB, the recorded data is 25 GB, the ratio of the logical overwrite area is 5%, the average seek time is 50 ms, and the disc block size is 2048 bytes, the access time to be added is (25 GB/2048)*0.05*50 ms*2=122070 s=17 hours. From this, it can be inferred that if just 1% of overwrites occurs when about half of the whole capacity of the disc is used, an additional required time of about 3 hours would be added to the access time.

According to aspects of the present invention as described above, fragmentation caused by logical overwrites can be improved. By doing so, when data is reproduced, the access time can be reduced and the frequency of seek operations can be reduced, thereby reducing noise and power consumption.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As discussed above, fragmentation of data occurs when portions of the data become physically fragmented into different areas. That is, if areas of a disc that contain portions of the data are defective, then the portions of the data in the defective areas of the disc are recorded in other areas of the disc that are not defective. In aspects of the present invention, the fragmented data is rewritten in a non-defective area of the disc in both logical and physical order so that the data is no longer fragmented or no longer contains defect data.

Although aspects of the present invention are discussed in terms of areas that are defective, it is understood that the underlying area need not be defective, and instead, a portion of the data may be defective. Aspects of the present invention is equally applicable to such cases since fragmentation of data also occurs when defective data needs to be rewritten to another area of a write-once disc, as an area containing the defective data cannot be rewritten with non-defective (or corrected) data in the write-once disc. As the non-defective (or corrected) data is written in the another area of the write once disc, fragmentation of data occurs. In aspects of the present invention, the fragmented data, including the non-defective (or corrected) data, may be rewritten in yet another area of the disc in both logical and physical order so that the data is no longer fragmented or no longer contains defect data.

Although aspects of the present invention are discussed in terms of a disc or a write-once disc, the aspects are applicable to information recording medium in general, as well as rewritable discs.

In various aspects, at least one of and and/or refer to alternatives chosen from available elements so as to include one or more of the elements. For example, if the elements available include elements X, Y, and Z, at least one of and and/or refer to X, Y, Z, or any combination thereof.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-transitory information recording medium comprising:
   a first area in which user data is recorded, wherein by a request to write replacement data to replace first data at a first address in which the first data is already recorded, the replacement data to replace the first data is recorded at a second address in the first area by logical overwrite; and
   a second area in which the user data recorded in the first area is copied and recorded,
   wherein when the user data recorded in the first area is copied and recorded in the second area, the replacement data for replacing the first data is copied and recorded at a third address in the second area, corresponding to the first address in which the first data is already recorded in the first area.

2. The non-transitory information recording medium of claim 1, wherein a logical start address of the information recording medium corresponds to a physical start address of the second area.

3. The non-transitory information recording medium of claim 1, wherein information indicating that data from a start address to a last address of the first area is replaced by data from a start address to a last address of the second area is recorded in a predetermined area of the information recording medium.

4. The non-transitory information recording medium of claim 1, comprising a plurality of recording layers,
   wherein the first area comprises at least one recording layer from among the plurality of recording layers, and the second area comprises at least one other recording layer from among the plurality of recording layers.

5. The non-transitory information recording medium of claim 4, wherein the at least one other recording layer included in the second area is designated as a valid recording layer, and information on the valid recording layer is recorded in a predetermined area of the information recording medium.

6. An apparatus to record data on an information recording medium, the apparatus comprising:
   a pickup to record data on the information recording medium, the information recording medium comprising a first area in which user data is recorded, wherein by a request to write replacement data to replace first data at a first address in which the first data is already recorded, the replacement data to replace the first data is recorded at a second address in the first area by logical overwrite; and
   a control unit to control the pickup to copy and record the user data recorded in the first area in a second area of the information recording medium, and to copy and record the replacement data for replacing the first data at a third address in the second area, corresponding to the first address in which the first data is already recorded in the first area.

7. The apparatus of claim 6, wherein the control unit controls to set a logical start address of the information recording medium to correspond to a physical start address of the second area.

8. The apparatus of claim 6, wherein the control unit further controls the pickup to record information indicating that data from a start address to a last address of the first area is replaced by data from a start address to a last address of the second area in a predetermined area of the information recording medium.

9. The apparatus of claim 6, wherein the information recording medium comprises a plurality of recording layers, and the first area comprises at least one recording layer from among the plurality of recording layers, and the second area comprises at least one other recording layer from among the plurality of recording layers.

10. The apparatus of claim 9, wherein the control unit further designates the at least one other recording layer included in the second area as a valid recording layer, and controls the pickup to record information on the valid recording layer in a predetermined area of the information recording medium.

11. A method of recording data on an information recording medium, the method comprising:
copying user data recorded in a first area of the information recording medium and recording the copied user data in a second area of the information recording medium, the first area is one in which user data is recorded, wherein by a request to write replacement data to replace first data at a first address in which the first data is already recorded, the replacement data to replace the first data is recorded at a second address in the first area by logical overwrite,
wherein when the user data recorded in the first area is copied and recorded in the second area, the replacement data for replacing the first data is recorded at a third address in the second area, corresponding to the first address in which the first data is already recorded in the first area.

12. The method of claim 11, wherein a logical start address of the information recording medium corresponds to a physical start address of the second area.

13. The method of claim 11, wherein information indicating that data from a start address to a last address of the first area is replaced by data from a start address to a last address of the second area is recorded in a predetermined area of the information recording medium.

14. The method of claim 11, wherein the information recording medium comprises a plurality of recording layers, and the first area comprises at least one recording layer from among the plurality of recording layers, and the second area comprises at least one other recording layer from among the plurality of recording layers.

15. The method of claim 14, further comprising designating the at least one other recording layers included in the second area as a valid recording layer, and recording information on the valid recording layer in a predetermined area of the information recording medium.

16. An apparatus to reproduce data from an information recording medium, the information recording medium including a first area in which user data is recorded, wherein by a request to write replacement data to replace first data at a first address in which the first data is already recorded, the replacement data to replace the first data is recorded at a second address in the first area by logical overwrite, the apparatus comprising:
a pickup to read data from the information recording medium; and
a control unit to control the pickup to read user data from a second area of the information recording medium in which user data recorded in the first area is copied and recorded, and the replacement data for replacing the first data is copied and recorded at a third address in the second area, corresponding to the first address in which the first data is already recorded in the first area.

17. The apparatus of claim 16, wherein the control unit controls to set a logical start address of the information recording medium to correspond to a physical start address of the second area.

18. The apparatus of claim 16, wherein the control unit further controls the pickup to read information indicating that data from a start address to a last address of the first area is replaced by data from a start address to a last address of the second area from a predetermined area of the information recording medium.

19. The apparatus of claim 16, wherein the information recording medium comprises a plurality of recording layers, and the first area comprises at least one recording layer from among the plurality of recording layers, and the second area comprises at least one other recording layer from among the plurality of recording layers.

20. The apparatus of claim 19, wherein the control unit further controls the pickup to read information that designates the at least other recording layer included in the second area as a valid recording layer, from a predetermined area of the information recording medium.

21. A method of reproducing data from an information recording medium including a first area in which user data is recorded, wherein by a request to write replacement data to replace first data at a first address in which the first data is already recorded, the replacement data to replace the first data is recorded at a second address in the first area by logical overwrite, the method comprising:
reproducing user data from a second area of the information recording medium in which user data recorded in the first area is copied and recorded, and the replacement data for replacing the first data is copied and recorded at a third address in the second area, corresponding to the first address in which the first data is already recorded in the first area.

22. The method of claim 21, wherein a logical start address of the information recording medium corresponds to a physical start address of the second area.

23. The method of claim 21, further comprising reproducing information indicating that data from a start address to a last address of the first area is replaced by data from a start address to a last address of the second area, from a predetermined area of the information recording medium.

24. The method of claim 21, wherein the information recording medium comprises a plurality of recording layers, and the first area comprises at least one recording layer from among the plurality of recording layers, and the second area comprises at least one other recording layer from among the plurality of recording layers.

25. The method of claim 24, further comprising reproducing information that designates the at least other recording layer included in the second area as a valid recording layer, from a predetermined area of the information recording medium.

* * * * *